United States Patent Office 3,008,526
Patented Nov. 14, 1961

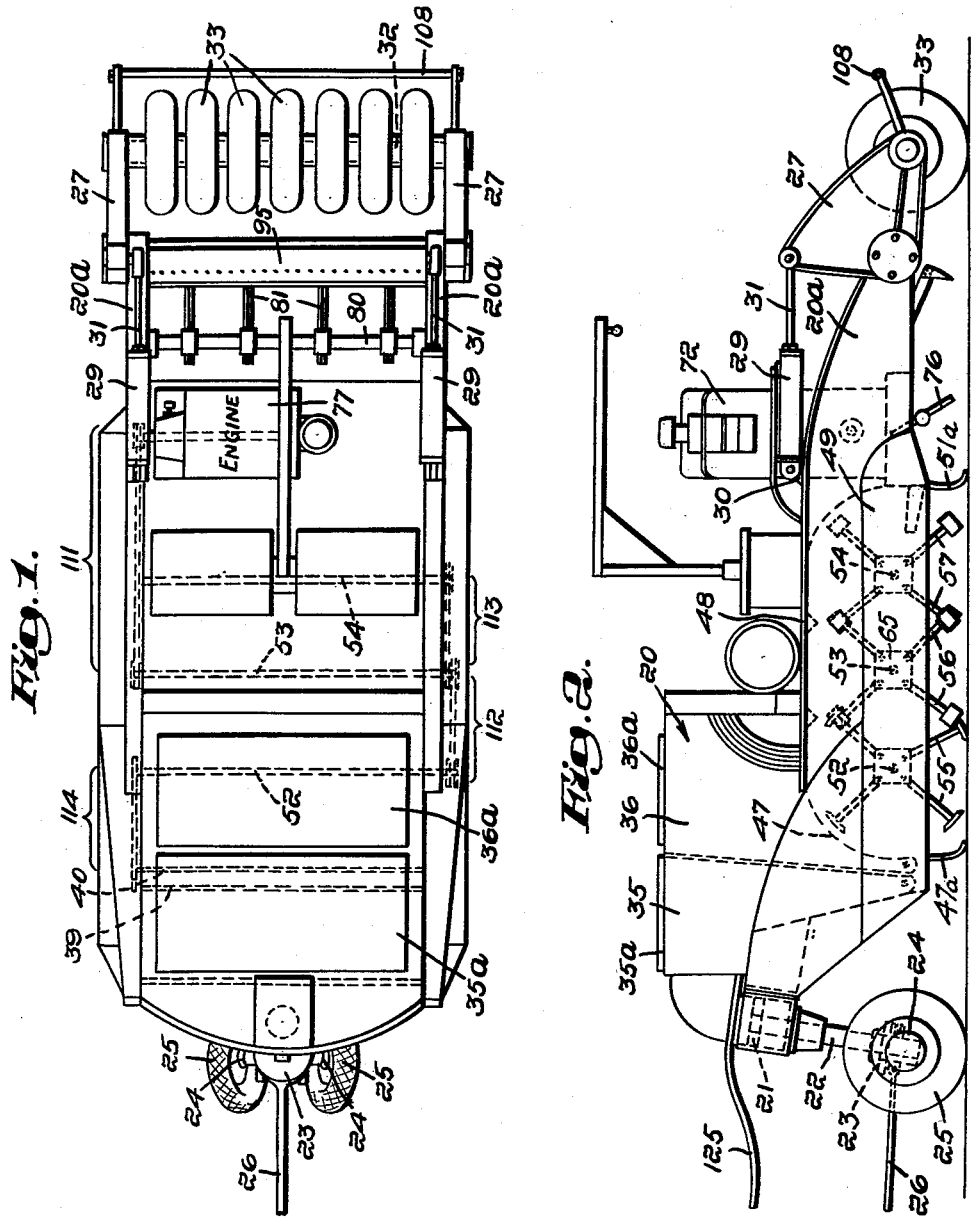

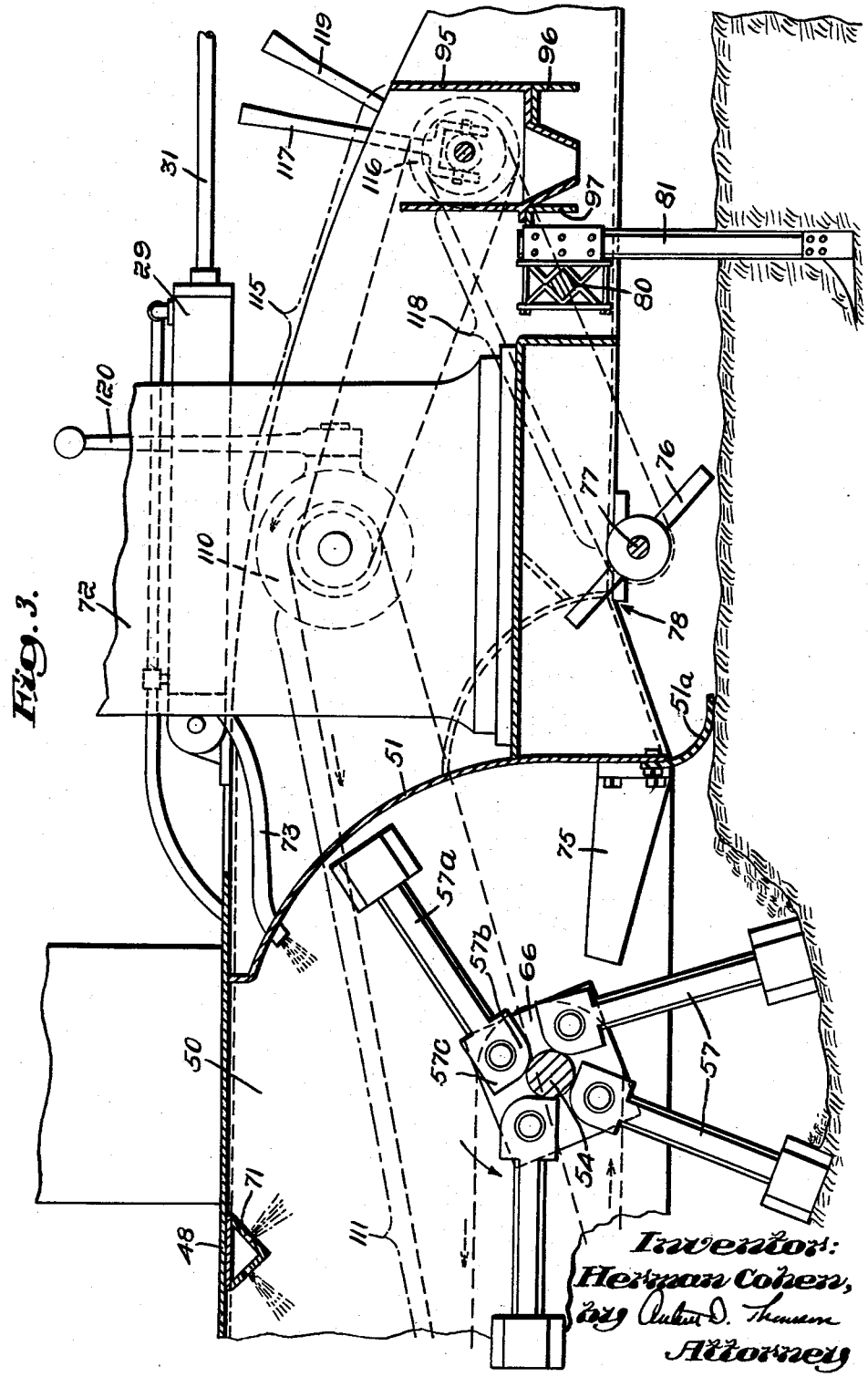

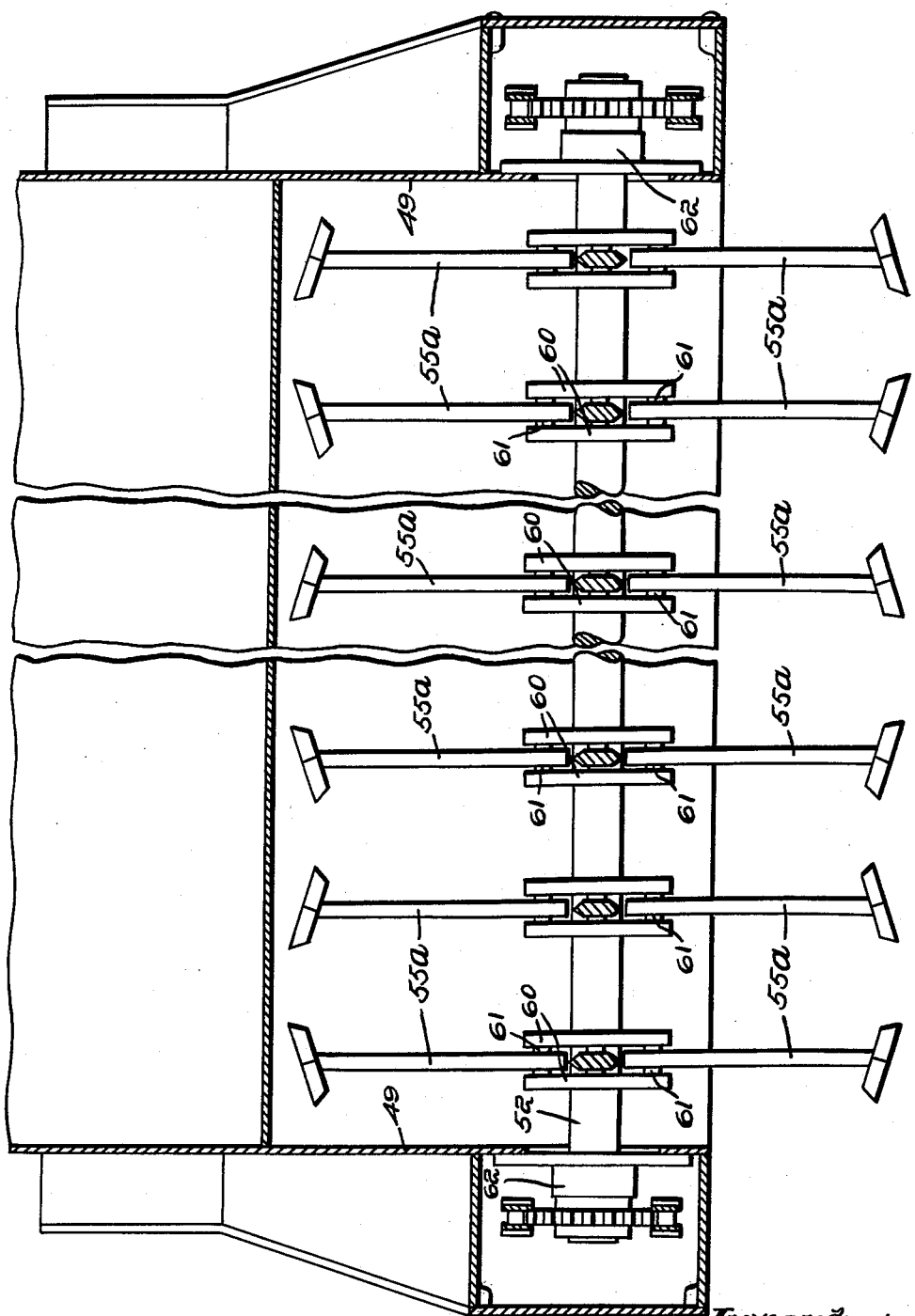

3,008,526
SOIL CONDITIONING APPARATUS
Herman Cohen, Kennebunk, Maine, assignor to Norton Portland Corporation, Portland, Maine, a corporation of Maine
Filed June 22, 1956, Ser. No. 593,267
1 Claim. (Cl. 172—45)

This invention relates to machinery for conditioning soil for planting or for other purposes. The machine here disclosed is especially useful in farming for preparing the soil and planting, but may also be converted to other uses, such as preparation of ground for making roads.

The preparation of soil for planting according to methods presently used in farming, involves a number of separate operations and a considerable amount of labor and time. In general, the land is first plowed by a single plow, or gang plow. The depth of penetration which can be achieved economically by means of conventional plows is limited because of the amount of power required for dragging the plow through the soil. After plowing, the sod is broken up by means of a harrow. It is usually necessary to repeat this operation a number of times in order to break the soil up sufficiently and finely for seeding. When the soil is finally prepared, the planting is done by a suitable seeding machine. Fertilizer and other chemicals for conditioning the soil must also be applied either during the harrowing operation or at the time of seeding. The amount of labor required for each of these separate operations is considerable, and an even more important factor is the lapse of time between plowing and seeding. These preparatory operations must be performed when the ground is reasonably dry, and unfavorable weather conditions frequently make it impossible to plant early enough for the crop to reach its full development during the growing season. Also, the benefit of the preparatory operations may be largely lost on account of unfavorable weather. For example, if the field cannot be harrowed immediately after plowing, weed growth will deteriorate the soil and make harrowing more difficult, and if rain delays the planting after the land is harrowed, the tract may have to be harrowed again.

The time of planting and the weather conditions prevalent when the crop is planted are the most important factors in controlling the quantity and quality of the crop. For example, certain crops will grow poorly unless they are started and achieve a considerable part of their growth while the weather is still cool. If weather conditions during the spring seriously delay the preparation of the soil, such crops are likely to fail. Furthermore, in cold climates where the growing season is relatively short, certain slow growing crops, which might be raised successfully if planted as soon as the land has thawed, cannot now be raised because of the time required for preparing the soil.

According to the methods now in use, fertilizer and other chemicals are spread on the surface of the ground, or mixed only to a very limited depth by harrowing. Some fertilizers, when thus applied, are not immediately effective. It takes several years, for example, for lime thus applied to be carried into the soil deep enough to improve the growth of crops. The application of fumigants and pest killers in this manner is also relatively ineffective. Many crops, such as cotton, which are highly susceptible to insect and fungus attack, cannot be planted on the same tract on successive years.

The principal object of this invention is to provide a machine which mixes fertilizer and chemicals evenly and thoroughly with the soil to any desired depth, which produces superior aeration of the soil, and which can be operated without damage on rocky or newly cleared land.

The various elements of the machine are all mounted on a frame which can be raised and lowered to work the soil to various depths. The mechanism for initially cutting into the soil consists of a number of rotating swinging hammers which strike the soil at high speed and penetrate to the desired depth in a circular path. A series of these hammers are mounted on a shaft to form a cut of the desired width and several rows of hammers of this general type are mounted to follow each other in succession so as to thoroughly break up and pulverize the soil which has been dug up by the first row. The hammers are all mounted to rotate in a mixing chamber which is enclosed at the top and sides, and powdered or atomized chemicals may be sprayed into the chamber to become thoroughly mixed with the soil which is thrown upward by the hammers. The hammers are swingably mounted on their shafts and have a unique inner end construction which tends to hold the hammer radially outward as it descends but allows the hammer to swing out of the way if it strikes a rock or other construction.

In the drawings illustrating a preferred embodiment of the invention:

FIG. 1 is a plan view of the machine;

FIG. 2 is a side elevation of the machine;

FIG. 3 is an enlarged fragmentary cross-section of the rear portion of the machine and;

FIG. 4 is an enlarged horizontal cross-section taken in the region of the front series of hammers.

The working parts of the machine are mounted in a rigid frame or chassis, generally indicated by the numeral 20, ordinarily made up of steel panels bolted or welded together and appropriately reinforced with framework. On the forward part of the chassis is an hydraulic cylinder 21 having a piston rod 22 on which the front axle yoke 23 is rotatably mounted. This yoke carries axles 24 on which the front wheels 25 are mounted. The axles may be tilted downward so that the wheels 25 "toe in" at the bottom. A tow bar 26, for towing the device behind a tractor, is connected to yoke 23.

The body has two tail extensions 20a to which a pair of brackets 27 are rotatably connected. A pair of hydraulic cylinders 29 are rotatably connected at one end to brackets 30 on the frame of the machine, and have their piston rods 31 connected to brackets 27. The latter carry a cross shaft 32 on which a number of wheels 33, which support the rear end of the machine, are mounted. The main frame 20 of the machine is thus supported on front wheels 25 and rear wheels 33, and can be raised and lowered by operating the hydraulic cylinders 21 and 29.

In the forward part of the machine are bins 35 and 36, which are provided with removable covers 35a and 36a, and are used to store the powdered fertilizer and chemicals, such as lime, of the types which should be mixed with the soil to a considerable depth for best results.

Behind bin 36 in the lower part of the machine is a chamber 50 which is referred to as the breaking or mixing chamber. The front wall of this chamber consists of a curved plate 47, which may also serve as the rear wall of bin 36. The top of the chamber is enclosed by a flat deck 48 which is part of the frame of the machine. The frame also has side skirts 49 which enclose the sides of chamber 50, and the rear wall 51 of the chamber, as shown in FIG. 3, consists of a curved plate similar to plate 47. Flexible front and rear curtains 47a and 51a may be mounted to depend from the machine in the region of walls 47 and 51, respectively. The bottom of the chamber is open. Across this chamber are mounted three shafts 52, 53 and 54, on which the sets of soil breaking hammers 55, 56 and 57 are mounted.

The arrangement of one of the sets of breaking hammers is best shown in FIG. 4. A number of pairs of rectangular "spider" plates 60 are fixed to shaft 52 by welding or any other convenient means. Each pair of plates carries one near each corner, on which the four pins 61, inner ends of the arms 55a of the four hammers are rotatably mounted. Shaft 52 is supported in a pair of bushings 62 mounted on the skirts 49 of the machine, and is continuously driven while the machine is in operation, as will be further described. The mounting of shafts 52 and 53 is similar, and hammers 56 and 57 are similarly mounted on pairs of spiders 65 and 66.

As exemplified with respect to the hammer 57 in FIG. 3, each hammer arm 57a has a rounded corner 57b and a square corner 57c at its inner end. The hammers are mounted so that the rounded corner will lie upward in the descending part of the hammer path, so that the hammer can swing upward freely on hitting an obstruction. The square corner serves as a stop which will engage shaft 54 to limit the swing of the hammer in the opposite direction. It is understood that, when the hammer shafts are being driven, the centrifugal force on the hammers will cause them normally to extend substantially radially with respect to the shaft.

The first set of cutting hammers, those mounted on shaft 52, are driven in such a direction (counter-clockwise as viewed in FIG. 2) as to move downward on the forward part of their path. These hammers perform the initial cut in the soil. The hammers will pass through the soil along generally semicircular paths in a vertical plane, each hammer, as it descends, striking the ground a short distance ahead of the cut made by the previous hammer.

The shaft on which hammers 56 are mounted is rotated at approximately the same speed as shaft 52, in the opposite direction (clockwise, as viewed in FIG. 2). The shaft on which hammers 57 are mounted is driven, also at the same speed, in the same direction as shaft 52. It is understood that a single set of hammers may be sufficient in some soils, and that more than three sets may be employed under other conditions. In the latter case successive sets are driven in alternate directions.

In addition to breaking up the soil below the surface level, the revolving hammers throw soil up into chamber 50 where they perform a pulverizing and mixing function. Perforated V-shaped conduits 71 are secured transversely to the top wall 48 of the mixing chamber 50 between the sets of hammers and are employed for spraying liquid fertilizers, fumigants, or pest killers into the chamber to become thoroughly mixed with the churned-up soil. Tanks of these solutions may be mounted in any convenient location on the machine, and connected by suitable piping to conduits 71. In order to employ the exhaust fumes of the engine 72, which drives the machine, as a pest killer, the exhaust pipe 73 is connected to discharge into chamber 50.

The power for driving the various parts of the machine is taken from the engine 72 through a gear reduction unit 110 (FIG. 3). A chain and sprocket drive 111 from this unit drives the center hammer shaft 53, and chain and sprocket drives 112 and 113 (FIG. 1) connect this shaft to shafts 52 and 54, respectively. From shaft 52 another chain and sprocket drive 114 is taken off to drive the agitator screws 39 and 40 which are geared together. As shown in FIG. 3, a chain and sprocket drive 115 from the gear reduction unit drives a shaft 116, which, in turn, is connected through a clutch 17 to a chain and sprocket drive 118 which drives the shaft 77 on which the doctor blade 76 is mounted. Shaft 116 may be connected in any suitable manner to the seed dispensing mechanism of the removable hopper 95 supported between the cross bars 96, 97 of the machine. The latter is controlled by a separate clutch 119. It is understood that the various units may be driven by gearing or belt drives. The three hammer shafts are preferably connected to be driven simultaneously. The gear reduction unit 110 may be arranged to provide several speeds by means of a gear shift 120, or a variable speed drive of conventional type may be substituted to provide a continuous range of speed variation for the hammers.

The machine here disclosed is designed to be towed by a tractor, but it is understood that the machine may be provided with its own propulsion system.

The machine operates as follows:

To start a cut, the hammers are started and the body 20 of the machine is lowered by operating the hydraulic cylinders 21 and 29 until the hammers penetrate the soil to the desired depth. The machine is then started moving forward with the hammers running. The doctor blade 76 is ordinarily started at the same time as the machine starts to move forward. The shutters which control the flow of materials from bins 35 and 36, the flow of spray through conduits 71, and the operation of the seeder, are started when the machine reaches the point where it is desired to begin planting.

When the machine is in full operation and is being moved continually forward, the hammer progressively will pulverize, and mix with fertilizer or other materials, a strip of soil the width of the machine. The soil is levelled by passage of the doctor blade. The subsoil cutters 81 removably secured to the tool bar 80, when used, open the subsoil, and the strip is then progressively planted, packed down by the wheels 33, and surface sprayed by any suitable solution applied through pipe 108. Pipe 108 may be connected in any suitable manner to supply tanks, not shown, mounted on the machine. All the operations necessary for preparing and planting a tract of land are thus performed in a single passage over the land.

To use the machine for road making, the wheels 33 are replaced by a continuous roller, and asphalt emulsion or similar material is sprayed into chamber 50 to become mixed with the soil which is worked by the hammers. The mixed road surfacing material is then levelled and packed by the doctor blade and roller.

The hammers break the soil largely by impact rather than by thrust. The torque requirements of the drive shafts are thus comparatively low, and the overall horsepower required for operating the hammers is considerably less than is required for dragging a gang plow of comparable soil breaking capacity for example. The hammer speed may be varied according to the nature of the soil and, in general, a higher hammer speed will produce a greater degree of pulverization or successfully break up very rocky or rooty soil where other methods of cultivation are difficult and ineffective. The three sets of hammers may be driven at different speeds. For example, a speed of 900 r.p.m. for the front set, 1350 r.p.m. for the middle set, and 1800 r.p.m. for the rear set has been found satisfactory.

The savings of time and labor achieved by preparing the soil and planting in a single pass are obvious. This machine, moreover, produces a much more uniform soil bed than can be achieved by plowing and harrowing, and mixes fertilizers, fungicides, and other soil treating materials deeper into the soil, more intimately, and more uniformly than has hitherto been possible. The machine also has a levelling effect, which a plow or cultivator does not have, because of the fact that the frame is suspended on two widely spaced points, so that high spots will be cut into more deeply by the hammers and levelled off by the doctor blade.

Branches and small stumps, tough roots, and stones are readily broken up under the high impact of the hammers. Large buried rocks and stumps will not damage the machine because the hammers will yield and slide over the obstructions. The machine may thus be used on rough terrain which is uneconomical or even impossible to cultivate with conventional farm machinery. The hammers and other working parts are of simple construction, and the hammers need not be frequently sharpened, as plow and harrow blades do, because of the fact that the soil is broken by impact rather than a simple cutting action.

While the machine is especially suited for farm use or road making, it is readily adapted to perform other tasks such as grading or packing snow.

What is claimed is:

In soil conditioning apparatus of the type comprising a vehicle adapted to move over a land surface and having a closed chamber with a bottom opening disposed to closely overlie the land surface: a shaft mounted transversely across said chamber, a pair of spaced plates mounted on said shaft substantially perpendicular thereto, a number of soil breaking hammers, each hammer having an inner end portion disposed between said plates, a number of pins each swingably securing one of said inner end portions to said plates whereby said hammers are swingable in a plane parallel to said plates, and drive means for continuously rotating said shaft in a given direction, said inner end portions being generally rectangular and having a first straight side engageable with said shaft and adapted to limit the swing of said hammers in the direction of rotation of the shaft and hold each hammer as it moves toward said opening in a position extending outward from the shaft, each of said inner end portions having a second straight side at right angles to the said first straight side, and an arcuate surface connecting said sides.

References Cited in the file of this patent

UNITED STATES PATENTS

| | | |
|---|---|---|
| 335,966 | Shaw | Feb. 9, 1886 |
| 373,159 | Svendsen | Nov. 15, 1887 |
| 437,872 | Stone | Oct. 7, 1890 |
| 1,227,089 | Tanczer | May 22, 1917 |
| 1,630,422 | Gillespie | May 31, 1927 |
| 1,632,969 | Horner et al. | June 21, 1927 |
| 1,893,871 | Romera | Jan. 10, 1933 |
| 2,046,417 | Talbot et al. | July 7, 1936 |
| 2,278,864 | Christensen | Apr. 7, 1942 |
| 2,394,017 | Seaman | Feb. 5, 1946 |
| 2,396,426 | Jackson | Mar. 12, 1946 |
| 2,424,460 | Hettelsater | July 22, 1947 |
| 2,520,229 | Trauger | Aug. 29, 1950 |
| 2,556,072 | Dewey | June 5, 1951 |
| 2,748,535 | Skromme | June 5, 1956 |

FOREIGN PATENTS

| | | |
|---|---|---|
| 52,345 | France | Oct. 25, 1943 |

(Addition to No. 886,890)